United States Patent [19]

Bogema et al.

[11] Patent Number: 5,513,542
[45] Date of Patent: May 7, 1996

[54] DRIVELINE SYSTEMS ANTI-RATTLE MEANS

[75] Inventors: Edward J. Bogema, Vicksburg; Lon C. Miller, Grand Junction, both of Mich.

[73] Assignee: Eaton Corporation, Cleveland, Ohio

[21] Appl. No.: 729,244

[22] Filed: Jul. 12, 1991

[51] Int. Cl.[6] .................................. F16H 3/08; F16D 3/10
[52] U.S. Cl. ........................... 74/331; 403/359; 464/160
[58] Field of Search ..................... 74/409, 331; 464/180, 464/162, 161, 160; 403/359

[56] References Cited

U.S. PATENT DOCUMENTS

| | | | |
|---|---|---|---|
| 3,105,395 | 10/1963 | Perkins | 74/745 |
| 3,364,768 | 1/1968 | Powell | 74/339 |
| 3,500,695 | 3/1970 | Keiser | 74/331 |
| 3,799,002 | 3/1974 | Richards | 74/745 |
| 4,375,172 | 3/1983 | Richards et al. | 74/339 |
| 4,640,145 | 2/1987 | Vandervoort | 74/325 |
| 4,795,403 | 1/1989 | Heine et al. | 464/180 X |
| 4,932,809 | 6/1990 | Kopp | 403/359 |

FOREIGN PATENT DOCUMENTS

| | | |
|---|---|---|
| 209316 | 1/1987 | European Pat. Off. . |
| 1625764 | 1/1970 | Germany . |
| 2349387 | 4/1975 | Germany . |

OTHER PUBLICATIONS

SAE Publication titled "Mathematical Model and Computer Simulation of Idle Gear Rattle"; Author: Andrew Szadkowski; pp. 81–97; (Not Dated).
EPO WPIL/Derwent Disclosure—Leningrad Forestry Academy Bul. 16 Apr, 30, 1981.

*Primary Examiner*—Allan D. Herrmann
*Attorney, Agent, or Firm*—Donald A. Rowe; Howard D. Gordon

[57] ABSTRACT

An improved vehicle transmission which substantially reduces the noisy rattle normally produced by interengagement of the input shaft and the input drive gear of the transmission when the engine of the vehicle is operating at idle speed and the transmission is in neutral. The input shaft and the input drive gear are in constant driven relationship. In the inventive structure, the interengageable spline teeth of the input shaft and the input drive gear of the transmission are provided with a greater backlash than is normally used. The intermittent firings of the engine normally cause nonsynchronous rotation of the input shaft relative to the input drive gear with attendant engagement of their respective spline teeth. The increased backlash provides greater spacing between the interengaging teeth which substantially eliminates the engagement of the spline teeth and attendant rattle noise.

6 Claims, 2 Drawing Sheets

DRIVELINE SYSTEMS ANTI-RATTLE MEANS

BACKGROUND OF THE INVENTION

1. Field of the Invention

This invention relates to multiple countershaft, constant mesh, mechanical transmissions, primarily for use in trucks, of the type described in U.S. Pat. No. 4,640,145, the disclosure of which is incorporated herein by reference. The invention features improved input shaft and input drive gear backlash structure for such transmissions which minimizes the occurrence of rattle or noise produced when the vehicle is immobile, the transmission is in neutral, the master clutch is engaged and the engine is operating at idle speed. The inventive structure is applicable to the interconnecting means of the vehicle engine and transmission.

2. Description of the Related Art

Multiple countershaft transmissions of the type described in U.S. Pat. No. 4,640,145 have proven to be highly acceptable in trucks and other heavy-duty applications. However, when a driver stops a truck to eat, sleep or for other reasons and leaves the engine running at idle speed, a constant undesirable noise is emitted from the transmission. The rattle or noise is initiated by the engine idling or turning at a non-uniform velocity. The engine speed will increase when a piston fires, followed by a slowing until the next firing of a piston. This alternative increase and decrease of engine output speed, known as surging, causes a nonuniform input to the transmission. However, due to inertia the transmission input gearing tends to function uniformly. Thus, the input drive means and the input gear of the transmission tend to be nonsynchronous, the result of which is a rattle which can be very disturbing.

OBJECTS AND SUMMARY OF THE INVENTION

Objects

The object of the invention is to reduce or eliminate rattle or noise typically emitted from a truck transmission when the vehicle is immobile, the transmission is in neutral and the engine is operating at idle speed.

With the increased emphasis on reduced transmission noise for environmental and driver comfort reasons, another primary object of the invention is to reduce idle rattle in a fashion which is simple, easy to apply and economical, whether built originally in the transmission elements or subsequently added.

Summary

The invention substantially eliminates idle rattle present in prior art transmissions. The invention combats such undesired idle rattle by increasing the backlash between the engine and the gearing, preferably between the input shaft and the input drive gear of the transmission. The increased backlash mitigates the engagement between the input shaft and the input drive gear of the transmission when the engine is at idle speed. The increased backlash allows the transmission input shaft to slow relative to the rotational speed of the input gear in a nearly constant manner, substantially eliminating the nonsynchronous engagement of the transmission elements, namely the engaging faces of the input gear internal spline teeth and the input shaft spline teeth.

The present invention is a substantial improvement over the available multiple countershaft transmissions in that the application of the invention results in a relatively quiet transmission when in neutral, the vehicle is immobile and the engine is in idle speed. The structural means of the invention comprises a simple increase of backlash between the input shaft and the input drive gear of a transmission which is easily produced with little if any additional cost. The improved multiple countershaft transmission achieves its quietness by the increased backlash which mitigates the frequency and intensity of the impact of engagement of the input shaft spline teeth and the input drive gear spline teeth and results in substantial idle rattle reduction.

These and other objects and advantages of the invention will become apparent from the drawings and below detailed description of the invention.

DETAILED DESCRIPTION OF THE INVENTION

Terminology as used herein is for convenience of reference and is not to be intended to limit the scope of the invention.

Figure 1:
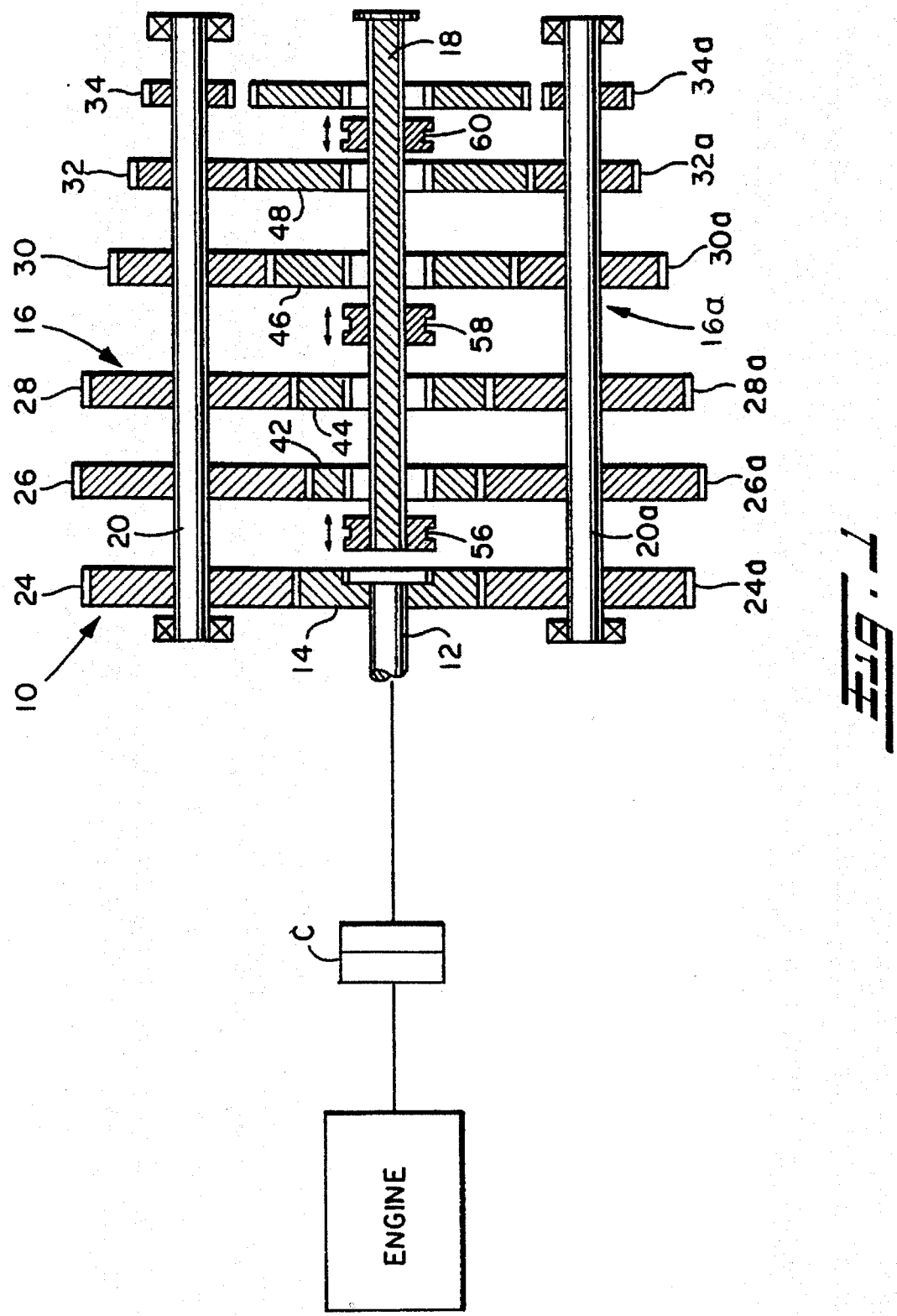
FIG. 1 is a schematic illustration of an embodiment of the present invention.

One embodiment of a multiple countershaft transmission is illustrated in FIG. 1. A transmission 10 is of the twin countershaft type, but may utilize a single countershaft or higher multiple countershafts in conjunction with the present invention.

The transmission 10 comprises an input shaft 12 designed to be driven by a prime mover E such as a diesel engine through a selectively disengaged, normally engaged friction masterclutch C. The input shaft 12 carries an input gear 14 which is typically non-rotatably connected to the input shaft by splines. A pair of countershaft assemblies, 16 and 16a, and a floating mainshaft 18 are provided. The transmission illustrated is a simple transmission but trucks often utilize compound transmissions comprising main and auxiliary sections.

The countershafts 20 and 20a, respectively, carry gears 24, 26, 28, 30, 32, 34 and 24a, 26a, 28a, 30a, 32a, 34a, respectively. Gears 42, 44, 46 and 48 encircle the mainshaft 18 and are constantly engaged with and supported by the countershaft gears. Axially slideable clutches 56, 58 and 60 are splined to the mainshaft for rotation therewith and may be selectively and individually engaged to rotationally fix the input gear 14, or gears 42, 44, 46 and 48 to the mainshaft 18.

The operation and structural features of the multiple countershaft type of transmission described above are well known in the prior art and are described in detail in several U.S. Patents assigned to the assignee of this invention including U.S. Pat. Nos. 3,105,395, 3,500,695, and 3,799,002, the disclosures of which are incorporated herein by reference.

In operation the input shaft 12 drives input gear 14 which is constantly engaged with countershaft gears 24 and 24a to drive the two countershaft assemblies 16 and 16a. The countershaft gears are constantly engaged with the mainshaft gears and thus the input gear, countershafts and countershaft gears, and the mainshaft gears 42, 44, 46, and 48, collectively referred to as "the input gearing", are constantly rotating whenever the input shaft is rotating. The operator of the vehicle causes movement of the sliding clutches 56, 58 and 60 to shift the transmission by coupling one of the mainshaft gears to the mainshaft 18. Shiftforks (not shown) of a standard design are provided for selective axial shifting of the clutches as is well known in the art.

When the transmission is in neutral, none of the sliding clutches are engaged with the mainshaft gears and thus the mainshaft 18 or output of the transmission is not being driven, and the vehicle driveline is not being driven and thus in a non-torque mode. However, input shaft 12 is driving input gear 14 and all the input gearing when the transmission is in neutral and it is the impact of the input shaft and input gear splines caused by the engine surging that is the source of the undesired noise.

Figure 2:
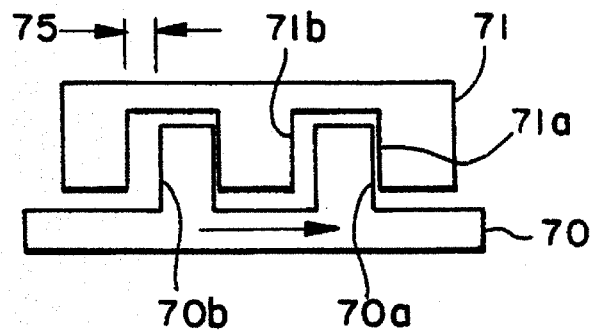
FIG. 2 is a schematic representation of the external spline teeth 70 of an input shaft to a transmission and the internal spline teeth 71 of an input drive gear of the transmission when the drive side flank 70a of the input shaft is in engagement with surface 71a of the input drive gear.
Figure 3:
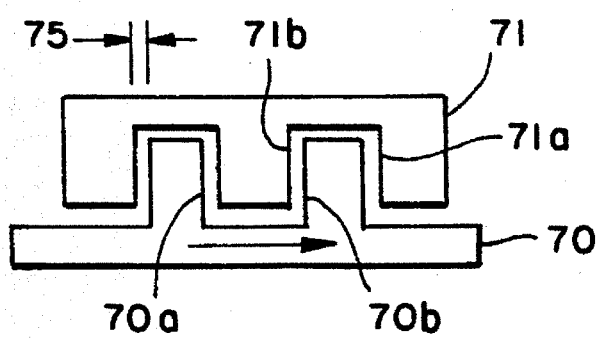
FIG. 3 is a schematic representation similar to FIG. 2, but illustrating the results of the inventive feature of using greater backlash between the interengaging spline teeth. The spline teeth of input shaft 70 and the corresponding spline teeth of the input drive gear 71 are configured so that they normally are spaced from and do not rattle against the other when the engine which drives the input shaft is in idle speed and the transmission is in neutral.

In FIGS. 2–3, the improved backlash structure is schematically illustrated. The non-rotatable connection of external splines 70 of input shaft 12 on the internal spline teeth 71 of the input gear 14 is depicted. The external spline teeth 70 of input shaft 12 has driveside flanks 70a and coast side flanks 70b which engage surfaces 71a and 71b, respectively, of the internal spline teeth 71 of input gear 14. The interengagement of splines 70 and 71 provides for some spacing 75 between the coast side flank 70b of the input shaft's external spline teeth and coast side surface 71b of the internal spline teeth of the input gear. This distance 75 is the backlash.

The input shaft 12 will tend to move at a certain rotational speed relative to the input drive gear 14 when the piston of the drive engine fires. However, the input shaft rotational speed will tend to decrease between firings of the engine pistons, while the inertia of the rotating input gearing will cause the input gear to rotate at a substantially constant rotational speed, setting up a different relative rotational speed between the input shaft and input drive gear.

Providing a greater than normal backlash mitigates or eliminates the engagement of coast side flank 70b of input shaft spline 70 with corresponding tooth surface 71b of the input gear spline 71 when the input shaft rotational speed decreases between firings of the engine.

Figure 4:
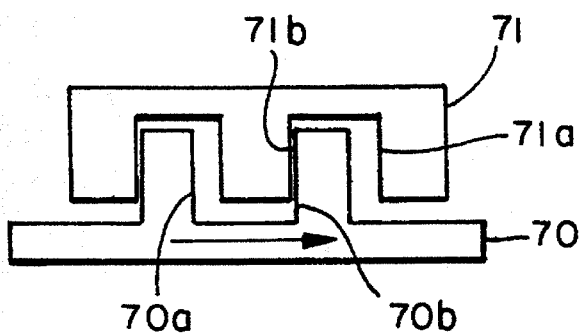
FIG. 4 is a schematic representation of the prior art structure.

In the prior art, little if any backlash is provided and the constant change of relative rotational speed between the input shaft 12 and the input drive gear 14 causes the driveside flanks 70a and the coast side flanks 70b of spline 70 to engage or bang against the side walls 71a and 71b, respectively, of the input gear spline 71. This engagement causes a rattle which is an unpleasant noise to the vehicle driver and those around the vehicle when the engine is in idle speed, the vehicle is immobile and the transmission in neutral. The invention mitigates the undesired idle rattle noise within the transmission by providing a greater than normal backlash to mitigate the engagement or impact of the flanks of the splines of the input shaft and the internal spline teeth of the input gear. See FIG. 4 which depicts the normal backlash which is not sufficient to prevent banging engagement of coast side surface 70b against spline wall 71b.

It has been found that increasing the backlash from its normal 0.005–0.010 inches to a greater backlash of up to 0.090 inches with an optimum range of 0.076–0.085 inches results in elimination in most cases and at least significant mitigation of the engagement of the spline teeth of input shaft 12 with the internal spline teeth of drive gear 14 as the engine slows between firings. However, the backlash could be even larger, depending on the driveline system of which the gearing is part of, and the strength of the materials of the interengaging spline and teeth.

By providing a greater than normal backlash, the impact of any change of relative rotational speed between the input shaft and the input drive gear is mitigated through the reduced contact between the teeth of the input shaft splines and the internal spline teeth of the input drive gear. This results in quieter performance when the engine is in the idle speed and the transmission is in neutral. The invention also allows the other transmission elements to rotate in a nearly constant manner which results in reduced noise.

Transmissions having the inventive structure have been field tested and all were successful in eliminating gear rattle when the transmissions were in neutral and the engine at idle speed.

Such use of greater backlash to eliminate or reduce the noise produced by a transmission when in neutral and the engine at idle speed can also be utilized in other elements of the vehicle drivetrain system that have interengaging parts, e.g., within the masterclutch or in the connecting means between the masterclutch and the input shaft of the transmission. While the best results of the invention have been in applications beginning with the input gear of the transmission and forward therefrom in the vehicle drivetrain system, the inventive features are also applicable in other gears, clutches and splines of a transmission.

While the optimum backlash is of a range from 0.076–0.085 inches, the only practical limitations are the amount of material or thickness of the splines and engaging gear teeth so as to (i) provide sufficient surface engagement to avoid a sloppy, ineffective engagement which would be readily noticeable by the driver and (ii) not make the teeth too thin that they break off during normal usage. The foregoing limitations are also influenced by the strength of the material of which the splines and teeth are made.

The invention would not add significantly, if at all, to the cost of production of the transmission as it will be merely a matter of making the transmission with the greater backlash when originally made or retrofitting the transmission with modified parts to provide the increased backlash.

While the invention has been described in its preferred form with a certain degree of particularity, it is understood that the disclosure has been made only by way of example and that numerous changes may be resorted to without departing from the spirit and the scope of the invention as hereinafter claimed.

What is claimed is:

1. Improved vehicle transmission means connected in series with an engine upstream of the transmission and operative when the vehicle is immobile, the engine is at idle speed and the transmission is in neutral mode with no torque output to the vehicle drive shaft downstream of the transmission, consisting of an input shaft driven by the engine and an input drive gear of the transmission in driven relationship with the input shaft when the engine is firing, the input shaft and input drive gear having interengaging teeth defining a backlash therebetween in the range of 0.010 to 0.090 inches so that when the engine is between firings, the input shaft and input drive gear move to a non-engaging relationship.

2. The improved vehicle transmission means of claim 1 wherein the transmission is a multiple countershaft transmission.

3. Improved input means of a vehicle transmission connected to an engine upstream of the transmission and operative when the vehicle is immobile, the engine is at idle speed and the transmission is in neutral mode with no torque output to the vehicle drive shaft downstream of the transmission, the transmission input means comprising an input shaft driven by the engine and an input drive gear of the transmission which is in driven relationship with the input shaft by means of interengaging teeth upon firing of the engine, and a non-driven relationship for a greater than normal time period when the engine is between firings and the input shaft slows down in relation to the input drive gear with separation of the teeth, the improvement consisting of providing greater than normal backlash in the range of 0.010 inches to 0.090 inches between the teeth.

4. The improved vehicle transmission of claim 3 wherein the transmission is a multiple countershaft transmission.

5. Improved vehicle transmission structure having an input shaft driven by an engine and operable when the vehicle is immobile, the transmission in neutral with no torque output to the vehicle drive shaft downstream of the transmission and the engine is at idle speed, the engine and transmission having interconnected means consisting of interengaging spline or gear teeth having backlash of at least 0.010 inches, said interconnected means having a constant driven relationship in one rotational direction in a first mode when the engine is firing and which between firings of the engine tend to move in a rotational direction opposite to that of the first mode to an engaging relationship in a second mode with attendant noisy rattle but are caused to be in non-engaging relationship without the noisy rattle by the backlash.

6. The improved vehicle transmission structure of claim 5 wherein the interconnected means are the input shaft driven by the engine and the input gear of the transmission and the interengaging spline or gear teeth are provided with a greater than normal backlash in the range of 0.076 to 0.085 inches.

\* \* \* \* \*